United States Patent [19]

Dakin et al.

[11] Patent Number: 4,872,741
[45] Date of Patent: Oct. 10, 1989

[54] ELECTRODELESS PANEL DISCHARGE LAMP LIQUID CRYSTAL DISPLAY

[75] Inventors: James T. Dakin; Sayed A. El-Hamamsy, both of Schenectady, N.Y.

[73] Assignee: General Electric Company, Schenectady, N.Y.

[21] Appl. No.: 222,980

[22] Filed: Jul. 22, 1988

[51] Int. Cl.⁴ .................................................. G02F 1/13
[52] U.S. Cl. ........................ 350/345; 313/483; 313/485; 313/491; 313/161; 313/607
[58] Field of Search ................... 350/345; 315/111.41, 315/111.51, 111.71; 313/161, 483, 484, 485, 494, 491, 607, 621, 231.61, 231.71

[56] References Cited

U.S. PATENT DOCUMENTS

| | | | |
|---|---|---|---|
| 2,185,674 | 1/1940 | Michel | 313/607 X |
| 2,519,302 | 8/1950 | Weincord | 313/607 X |
| 3,040,202 | 6/1962 | Lehmann | 313/483 |
| 4,097,130 | 6/1978 | Cole | 350/335 |
| 4,128,313 | 12/1978 | Cole et al. | 350/340 |
| 4,187,445 | 2/1980 | Houston | 315/54 |
| 4,293,794 | 10/1981 | Kapetanakos | 315/111.41 X |
| 4,341,976 | 7/1982 | Hanlet | 313/485 X |
| 4,417,184 | 11/1983 | Takesako et al. | 313/495 X |
| 4,430,598 | 2/1984 | Okada et al. | 313/495 X |
| 4,581,608 | 4/1986 | Aftergut et al. | 340/704 |
| 4,591,759 | 5/1986 | Chalek et al. | 313/638 |
| 4,735,495 | 4/1988 | Henkes | 350/345 |
| 4,765,718 | 8/1988 | Henkes | 350/339 R X |
| 4,771,215 | 9/1988 | Munakata et al. | 313/483 |
| 4,772,885 | 9/1988 | Uehara et al. | 350/345 X |
| 4,792,732 | 12/1988 | O'Loughlin | 313/607 X |

Primary Examiner—Stanley D. Miller
Assistant Examiner—Richard Gallivan
Attorney, Agent, or Firm—Marvin Snyder; James C. Davis, Jr.

[57] ABSTRACT

A light transmissive liquid crystal display is illuminated from its rear surface by a juxtaposed flat electrodeless discharge lamp. The lamp includes a pair of glass plates sealably enclosing a fill gas. The front plate carries a phosphor coating on its interior surface and the rear plate carries a phosphor coating and a reflective film. A rectangular array of RF coils behind the rear plate provides excitation for a plasma arc discharge within the fill gas whereby adjacent discharge current paths counter rotate. Ultraviolet radiation emitted by the plasma arc discharge excites the phosphor which produces visible light of uniform brightness that may be varied by varying the RF current amplitude in the coils.

20 Claims, 2 Drawing Sheets

ELECTRODELESS PANEL DISCHARGE LAMP LIQUID CRYSTAL DISPLAY

This invention relates to a liquid crystal display in which a liquid crystal display panel is illuminated by a generally flat electrodeless panel lamp and, more particularly, to a light transmissive liquid crystal display illuminated by a panel discharge lamp wherein a discharge region between a phosphor-coated transparent plate and a nonmetallic plate is excited by an array of radio frequency (RF) coils behind the nonmetallic plate.

BACKGROUND OF THE INVENTION

A liquid crystal display device typically comprises a pair of flat panels defining a volume in which a quantity of liquid crystal material is sealably contained. These liquid crystal materials may comprise dichroic dyes in a guest/host system, or twisted nematic materials. The flat panels generally include transparent electrode material on their inner surfaces. One panel may be covered completely by a single transparent ground plane electrode while the other panel is configured with an array of transparent electrodes, referred to as "pixel" (picture element) electrodes. Thus the typical cell in a liquid crystal display includes liquid crystal material situated between a pixel electrode and a ground electrode, forming a capacitor-like structure. Orientation of the liquid crystal material is affected by voltage aplied across the electrodes on either side of the liquid crystal material. A voltage applied to the pixel electrode typically effects a change in the optical properties of the liquid crystal material, resulting in display of information on the liquid crystal display (LCD) screen.

The utilization of transparent front and back panels and transparent electrodes permits the visual effects to be produced by transmission of optical radiation through the LCD device. These visual effects may be facilitated by employing a separate light source for the display, such as a fluorescent lamp type device. LCD display screens can be manufactured to produce color images by incorporating color filter mosaics in registration with the pixel electrode array. Some of these structures may employ polarizing filters to either enhance or complete the desired visual effect.

Liquid crystal displays of the transmissive type require, for proper illumination, flat, extended light sources having high, uniform surface brightness. Shallow depth light sources, moreover, enhance the utility of the liquid crystal display by detracting only minimally from its capability for utilization as a narrow depth display device.

One method of providing a light source with high, uniform brightness and shallow depth is to employ an array of tubular, fluorescent lamps in combination with a front surface diffuser. The diffuser acts to illuminate the dark regions between tubes and provide a uniform source of light over its entire flat, extended surface. However, the diffuser also degrades the average light intensity and this reduces the light source efficiency. End effects resulting from the multitude of cathode connections required to drive such an array of fluorescent lamps also reduce the light source efficiency.

A number of approaches may be taken to simultaneously maximize surface brightness and uniformity of brightness where the light source comprises an array of fluorescent lamps. These approaches include various combinations of diffusers, lenses and reflectors. Such system is set forth by J. L. Henkes in U.S. application, Ser. No. 941,002 filed Dec. 12, 1986 and assigned to the instant assignee, now issued as U.S. Patent No. 4,735,495 on Apr. 5, 1988. As described in that application, which is hereby incorporated by reference in its entirety, a high intensity light source (e.g., a discharge lamp) is positioned in an integrating sphere and tapered light pipes are positioned at an opening in the integrating sphere to produce a collimated output light beam which is projected onto a surface of the liquid crystal panel display. A modification of that approach is described in J. L. Henkes U.S. application Ser. No. 116,198 filed Nov. 3, 1987, U.S. Patent 4,765,718, and assigned to the instant assignee. In the latter application, the disclosure of which is hereby incorporated by reference in its entirety, a secondary collimator is positioned between the end of a light pipe collimator and the flat panel liquid crystal display. This modification reduces the offset of the collimated light beam toward the edge of the collimating light pipe.

Other types of flat light sources such as vacuum fluorescent and electroluminescent may also be used. Such sources, however, do not offer the combined brightness and energy conversion efficiency of low pressure discharge fluorescent lamps.

Accordingly, one object of the invention is to provide a flat panel liquid crystal display illuminated by a flat, uniformly bright, electrodeless lamp having adjustable brightness.

Another object of the invention is to provide a uniformly bright, efficient light source in a flat package suitable for use in illuminating liquid crystal displays.

Another object of the invention is to provide a uniformly bright, electrodeless arc discharge light source having a flat light-emitting surface.

Another object of the invention is to provide an electrodeless arc discharge lamp in a flat enclosure, wherein gases within the discharge space are excited by an array of coils located outside the enclosure behind one surface thereof and energized with radio frequency (RF) current.

Another object is to provide a flat, electrodeless arc discharge lamp that is readily dimmable.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

BRIEF SUMMARY OF THE INVENTION

Briefly, in accordance with one preferred embodiment of the invention, an illuminatable liquid crystal display comprises a light transmissive liquid crystal display panel and a flat source of uniformly distributed light positioned to illuminate the panel by directing visible light from a front surface of the source through the panel. The source includes a flat, electrodeless lamp containing a fill gas therein capable of emitting radiation of a predetermined wavelength when undergoing excitation, and also a phosphor-coated transparent emitting surface. Further included are coil means for coupling an electromagnetic field into the interior of the lamp to establish a plasma arc discharge therein, whereby ultraviolet radiation from the arc discharge excites the phosphor coated on the transparent emitting surface to produce the visible light.

In accordance with another preferred embodiment of the invention, a panel discharge lamp comprises an optically transparent plate and a second nonmetallic plate, separated by continuous sidewall spacers around the plate edges. The sidewall spacers seal the space between the glass plates so as to form an enclosure to contain therein an ionizable fill gas. The interior surface of the transparent plate is coated with a layer of phosphor while the interior surface of the second plate supports a layer of phosphor. A film of reflective material is also supported by the second plate. An external array of coils situated behind the second one of the plates is provided to excite the gas between the two plates and create an arc discharge which excites the phosphor to illuminate the display when the coils are excited with RF current. By varying the RF current amplitude supplied to the coils, the lamp may be dimmed or brightened as desired.

DETAILED DESCRIPTION OF THE INVENTION

Figure 1:
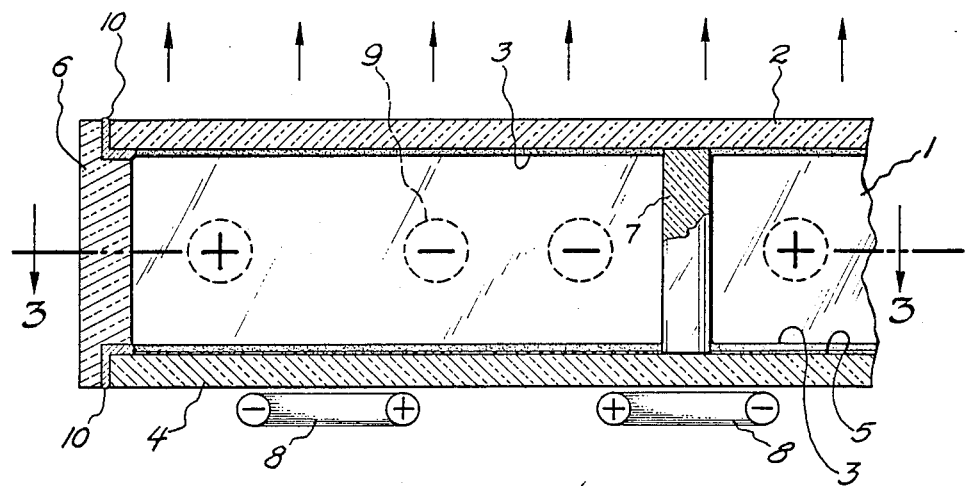
FIG. 1 is a fragmentary, partially broken away, sectional side view of a preferred embodiment of the panel lamp of the present invention.

FIG. 1 illustrates an electrodeless arc discharge lamp for a flat panel liquid crystal display according to the present invention. A suitable fill gas 1 is contained between two plates 2 and 4. The front plate 2, which may be comprised of glass, is coated on its interior or rear surface with a phosphor 3 which responds to irradiation at a predetermined wavelength, such as ultraviolet, by emitting radiation with uniform brightness in the visible region of the spectrum. The term "visible", as used herein, refers to wavelengths that extend throughout the visible light region of the spectrum and into the ultraviolet and infrared regions. The rear plate 4, which is nonmetallic, is coated with a film of nonmetallic reflective material 5, such as magnesium oxide ($MgO$). This film is shown on the interior or front surface of plate 4 although, if the plate is fabricated of transparent material such as glass, the film may be applied to the rear or exterior surface of plate 4. An additional coating of phosphor 3 is applied to the front surface of reflective material 5 or, if reflective film 5 is on the rear surface of plate 4, to the front surface of plate 4, thus being supported by the front or interior surface of plate 4 in either event. Side transparent elements 6, which may be comprised of glass, form a continuous sidewall that seals the fill gas within the lamp between the front and rear plates and spaces plates 2 and 4 parallel to each other at a predetermined distance from each other. If desired, the sidewalls may be coated with reflective material, such as $MgO$, in the same manner as rear plate 4. The glass interfaces are closed with a sealant 10, such as glass frit or a low vapor pressure epoxy. Transparent spacers 7, which may be comprised of quartz, act to support the front and rear plates against inwardly-directed atmospheric pressure tending to collapse the lamp due to the partial vacuum within the lamp and the relatively large area of the front and rear plates. RF coils 8 are situated externally of the lamp and arranged in an array parallel to the plane of the lamp (which is determined by the planes of front and rear plates 2 and 4, respectively). Coils 8, when energized by an external source (not shown) at an appropriate radio frequency, generate a plasma arc within the fill gas which provides excitation for phosphor layer 3 from which the light output is emitted by the lamp. The excitation for phosphor layer 3 from the plasma arc discharge is typically in the form of ultraviolet radiation. Reflective layer 5 enhances the amount of light emanating from the lamp through its transparent front plate 2.

Figure 2:
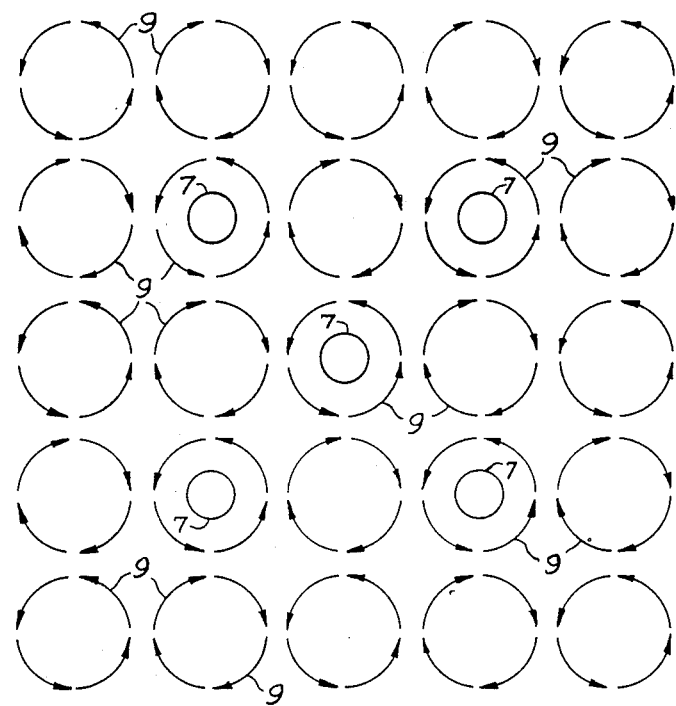
FIG. 2 schematically illustrates the rotation of circulating gas discharge currents in the lamp of the present invention, as viewed from the front of the lamp.

The symbols "−" and "+" shown in FIGS. 1 and 2 represent instantaneous current directions where "−" signifies current coming up out of the plane of the illustration and "+" signifies current moving downward into the plane of the illustration. Thus if it is assumed, for example, that current is increasing in both windings 8 shown in FIG. 1, an increasing magnetic field is induced about the windings, passing in a downward direction (i.e., away from the lamp) through the central opening of one winding and in an upward direction (i.e., toward the lamp) through the central opening of the other winding. A sufficiently rapidly increasing magnetic field induces an electric field that ionizes fill gas 1 and produces circulating discharge currents therein as shown in FIGS. 1 and 2. The current directions in coils 8 are selected such that adjacent discharge current paths in the lamp fill gas are counter rotating. By controllably varying the amplitude of current in coils 8, the magnetic induction of the field produced by the current in the coils may be controlled, thus controlling the circulating discharge currents in the fill gas and hence the intensity of electromagnetic radiation produced by the discharge currents.

FIG. 2 schematically illustrates the counter rotating arc discharge currents, induced by RF coils 8, which emit ultraviolet radiation that impinges on the phosphor of the front and rear plates. As a consequence of this ultraviolet irradiation, the phosphor radiates electromagentic energy in the visible spectrum. By insuring that each adjacent pair of discharge currents in the lamp fill gas counter rotate, all pairs of adjacent current paths in the lamp fill gas are additive; that is, they do not oppose or cancel each other, thereby avoiding dark spots that would otherwise appear in registry with those locations. Uniform brightness over the entire emitting surface of the lamp is thereby enhanced.

The fill gas in the lamp of FIG. 1 may comprise argon at a pressure in the range of 0.1 to 10 torr, with a small amount, such as 0.007 torr, of mercury vapor, although other suitable fill gas mixtures may be utilized, such as described in Chalek et al. U.S. Pat. No. 4,591,759, issued May 27, 1986 and assigned to the instant assignee. The disclosure of Chalek et al. U.S. Pat. No. 4,591,759 is hereby incorporated by reference. In a lamp of active area measuring 10 inches by 10 inches and a thickness of 1 inch, the amount of mercury employed in the lamp may be about 1 milligram. A lamp of this size may employ 25 excitation coils 8 arranged in a rectangular array or grid with 2 inch spacing. The coil density across the lamp area is such that the individual arc discharges produced by each respective coil 8 tend to merge or blend with each other to form a single arc that is distributed relatively uniformly in the fill gas. The frequency at which RF energy is supplied to the excitation coils may be, for example, 13.56 MHz. The ultraviolet radiation emitted by the arc discharge in the fill gas is absorbed by phosphor coatings 3 and converted to visible wavelengths. By being uniformly distributed over transparent front plate 2 and rear plate 4, phosphor coatings 3 further enhance the uniformity of output light distribution over the emitting surface of the lamp. Brightness of the lamp is also enhanced by reflective film 5 on the rear plate of the lamp while the presence of spacers 7, which are transparent, does little to detract from the uniformly bright light output from the lamp.

Figure 3:
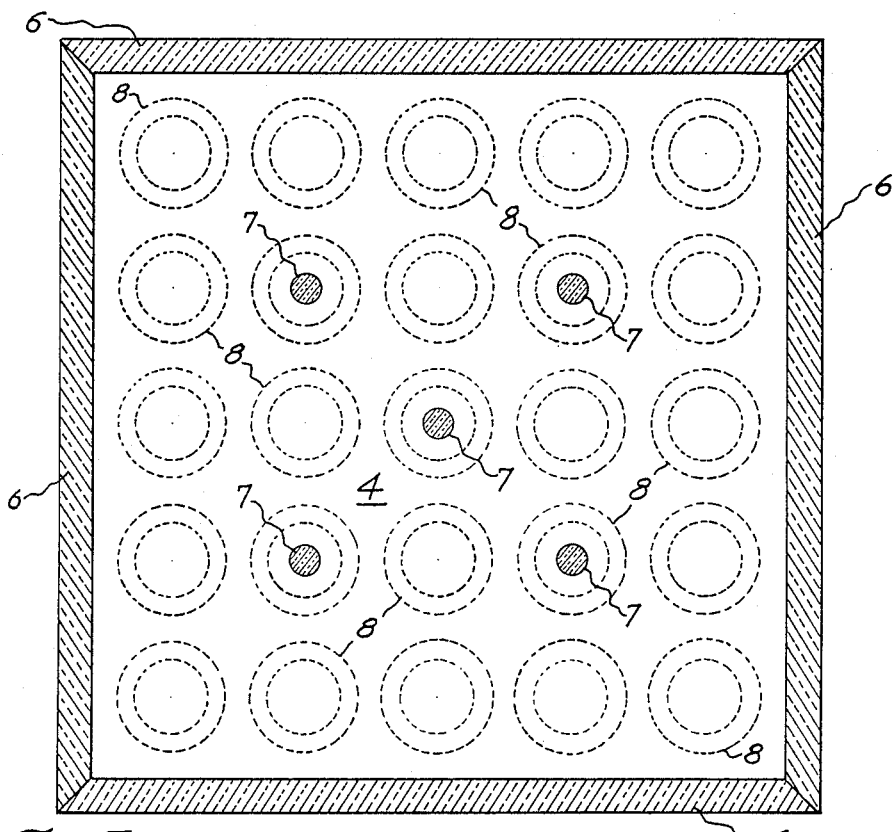
FIG. 3 is a cutaway view of the preferred embodiment of the panel lamp of the invention, taken along line 3—3 of FIG. 1.

As shown in FIG. 3, which is a view of the electrodeless discharge lamp of FIG. 1 taken along line 3—3, the plasma arc takes on the shape of a plurality of toroids in an array. With adequate current in coils 8, these toroids spread in radial thickness sufficiently to blend together into a single arc spread over the emitting area of the lamp so as to form a more uniform source of ultraviolet radiation than if the toroidal arcs remained discrete. The absence of electrodes within the lamp aids in maintaining high efficiency by avoiding electrode losses and the absorption of ultraviolet radiation by such electrodes that would otherwise occur. Some of the toroidal arcs are shown encircling a separate spacer 7, respectively. By making each spacer coaxial with a separate coil, respectively, the toroidal arc is prevented from colliding directly with a spacer and having its path altered, which would otherwise introduce a source of nonuniform emission of radiation from the lamp.

RF coils 8, shown in FIG. 1, may be connected in series and energized from a single RF source (not shown). By operating the source at other than communication frequencies, i.e., 13.56 MHz, any radio frequency interference (RFI) produced by the lamp does not interfere with any communication signals. The amplitude of the RF excitation current may be varied to vary the intensity of light produced by the lamp.

Figure 4:
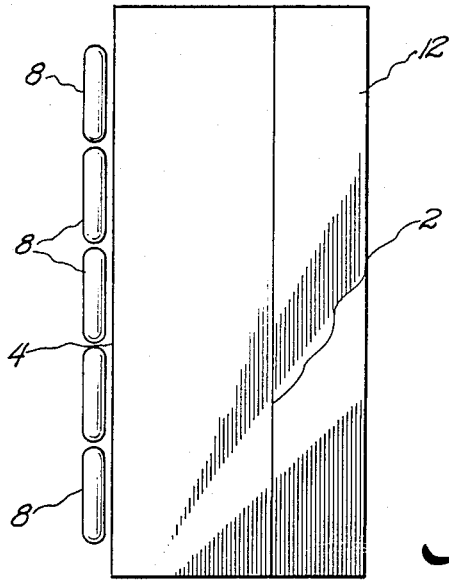
FIG. 4 is a sectional, schematic view of a transmissive liquid crystal display including a flat panel, electrodeless lamp for illuminating the display.

FIG. 4 illustrates employment of the panel lamp in conjunction with a liquid crystal display panel. Because the lamp undergoes substantially uniform excitation across its emitting surface 2 and the area of its phosphor coatings 3 (shown in FIG. 1), the light output from the lamp is of uniform brightness due to the further light leveling effect of the phosphor coatings on the ultraviolet radiation from fill gas 1. This permits the front surface of the panel lamp to be associated in juxtaposition with the rear portion of a light transmissive liquid crystal display panel 12, without requiring any intervening lenses. Examples of light transmissive liquid crystal display panels are set forth in H. S. Cole U.S. Pat. No. 4,097,130, issued June 27, 1978, H. S. Cole et al. U.S. Pat. No. 4,128,313, issued Dec. 5, 1978, and S. Aftergut et al. U.S. Pat. No. 4,581,608, issued Apr. 8, 1986, all of which are assigned to the instant assignee and the disclosures of which are hereby incorporated by reference.

The foregoing describes a liquid crystal display in which a light transmissive liquid crystal display panel is illuminated by a uniformly bright, efficient light source in a flat package. The lamp is of electrodeless arc discharge type with fill glass within the discharge space excited by RF current in excitation coils located outside the lamp enclosure. Illumination intensity is controllable by controlling the RF current amplitude.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What is claimed is:

1. An illuminatable liquid crystal display including:
   (a.) a light transmissive liquid crystal display panel; and
   (b.) a flat source of uniformly distributed light positioned to illuminate said panel by directing visible light from a front surface of said source through said panel, said source comprising:
   (1.) a flat, electrodeless lamp containing a fill gas therein capable of emitting radiation of a predetermined wavelength when undergoing excitation, said lamp including a first phosphor-coated transparent light-emitting surface and a second phosphor-coated light-emitting surface in parallel therewith; and
   (2.) coil means for coupling an electromagnetic field into the interior of said lamp to establish a plasma arc discharge therein, whereby ultraviolet radiation from said arc discharge excites the first and second phosphor-coated light-emitting surfaces to produce said visible light.

2. The illuminatable liquid crystal display of claim 1 wherein said coil means comprises an array of coils adapted to be energized by controllable amplitude RF current and oriented so as to excite said gas over substantially the entire extent of the first and second light-emitting surfaces.

3. The illuminatable liquid crystal display of claim 2 wherein said lamp includes a nonmetallic reflective surface situated behind, and in parallel with, said second phosphor-coated light-emitting surface, and said array of coils is situated externally of said source of light.

4. The illuminatable liquid crystal display of claim 3 wherein said array of coils is disposed substantially parallel to the plane of said source of light.

5. The illuminatable liquid crystal display of claim 4 wherein said array of coils is situated behind a rear surface of said source of light.

6. The illuminatable liquid crystal display of claim 1 wherein said panel includes front and rear surfaces, said rear surface being adapted to receive illuminating light and said front surface being adapted to display information.

7. The illuminatable liquid crystal display of claim 6 wherein the front surface of said source and the rear surface of said panel are juxtaposed.

8. The illuminatable liquid crystal display of claim 7 wherein said coil means comprises an array of coils adapted to be energized by controllable amplitude RF current, situated behind a rear surface of said source of light in a plane substantially parallel to the plane of said source of light, and oriented so as to excite said gas over substantially the entire extent of the front surface of said source.

9. A panel discharge lamp comprising:
   a first transparent plate;
   a second nonmetallic plate situated behind said first plate;
   a sidewall disposed around, and sealably joined to, said first and second plates and maintaining said plates apart from each other to form a sealed region therebetween;

a first phosphor coating supported by the interior surface of said first plate and a second phosphor coating supported by the interior surface of said second plate, said phosphor being responsive to excitation by electromagnetic radiation of predetermined wavelength by emitting visible radiation;

a fill gas contained in said sealed region, said gas being capable of supporting a plasma arc discharge therein when excited by an electric field of suitable intensity; and coil means for coupling an electromagnetic field of controllable magnetic induction into said fill gas to produce said radiation of predetermined wavelength.

10. The panel discharge lamp of claim 9 including a nonmetallic reflective film on one surface of said second plate.

11. The panel discharge lamp of claim 10 wherein said first and second plates are comprised of glass.

12. The panel discharge lamp of claim 11 wherein said reflective film is situated between the interior surface of said second plate and said second phosphor coating.

13. The panel discharge lamp of claim 9 wherein said fill gas comprises a mixture of argon at a pressure in the range of 0.1 to 10 torr and mercury vapor.

14. The panel discharge lamp of claim 13 wherein said coil means comprises an array of coils adapted to be energized by controllable amplitude RF current and oriented so as to excite said gas over substantially the entire extent of the area enclosed by said sidewall behind said first plate.

15. The panel discharge lamp of claim 14 wherein said coils are arranged in a rectangular array and connected to generate discharge currents within said fill gas in a pattern such that adjacent discharge current paths counter rotate.

16. The panel discharge lamp of claim 15 including a plurality of transparent spacers situated between said first and second plates, each said spacer being aligned coaxially with the axis of a separate coil, respectively.

17. The panel discharge lamp of claim 10 wherein said fill gas comprises a mixture of argon at a pressure in the range of 0.1 to 10 torr and mercury vapor.

18. The panel discharge lamp of claim 10 wherein said coil means comprises an array of coils adapted to be energized by controllable amplitude RF current and oriented so as to excite said gas over substantially the entire extent of the area enclosed by said sidewall behind said first plate.

19. The panel discharge lamp of claim 18 wherein said coils are arranged in a rectangular array and connected to generate discharge currents within said fill gas in a pattern such that adjacent discharge current paths counter rotate.

20. The panel discharge lamp of claim 10 wherein said reflective film comprises magnesium oxide.

* * * * *